(12) United States Patent
Kraus et al.

(10) Patent No.: US 11,547,057 B2
(45) Date of Patent: Jan. 10, 2023

(54) HYDRAULIC DAMPENING SYSTEM FOR A REAR GATE OF A ROUND BALER

(71) Applicant: DEERE & COMPANY, Moline, IL (US)

(72) Inventors: Timothy J. Kraus, Blakesburg, IA (US); Daniel E. Derscheid, Hedrick, IA (US); Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 219 days.

(21) Appl. No.: 16/855,663

(22) Filed: Apr. 22, 2020

(65) Prior Publication Data
US 2021/0329843 A1   Oct. 28, 2021

(51) Int. Cl.
*A01F 15/08* (2006.01)
*F15B 13/04* (2006.01)
(Continued)

(52) U.S. Cl.
CPC ...... *A01F 15/0883* (2013.01); *F15B 11/0406* (2013.01); *F15B 11/048* (2013.01);
(Continued)

(58) Field of Classification Search
CPC .............. A01F 15/0883; F15B 13/0401; F15B 11/0426; F15B 11/048; F15B 11/0406; F15B 2211/40507; F15B 2211/40584; F15B 2211/40592; F15B 2211/41527; F15B 2211/41536; F15B 2211/426;
(Continued)

(56) References Cited

U.S. PATENT DOCUMENTS

| 562,305 A | * | 6/1896 | Knight | F15B 11/048 |
| | | | | 91/403 |
| 2,211,370 A | * | 8/1940 | Ernst | F15B 11/17 |
| | | | | 60/427 |

(Continued)

FOREIGN PATENT DOCUMENTS

| EP | 1444882 A2 | 8/2004 |
| EP | 2183957 A1 | 5/2010 |

(Continued)

OTHER PUBLICATIONS

Extended European Search Report and Written Opinion issued in European Patent Application No. 21167873.5, dated Sep. 21, 2021, 8 pages.

(Continued)

*Primary Examiner* — Dustin T Nguyen

(57) ABSTRACT

A hydraulic system for operating a rear gate of a baler implement includes a hydraulic cylinder having a housing that defines an interior, and a piston that is moveably disposed within the interior of the housing. The housing includes a first fluid port and a second fluid port, each disposed in fluid communication with a first fluid volume of the hydraulic cylinder. A flow rate control valve is moveable between a first position for directing fluid to or from the first fluid port at a first flow rate, and a second position for directing fluid to or from the second fluid port at a second flow rate. The second flow rate is different than the first flow rate.

17 Claims, 15 Drawing Sheets

(51) Int. Cl.
*F15B 11/04* (2006.01)
*F15B 11/042* (2006.01)
*F15B 11/048* (2006.01)
*F15B 15/22* (2006.01)

(52) U.S. Cl.
CPC ...... *F15B 11/0426* (2013.01); *F15B 13/0401* (2013.01); *F15B 15/22* (2013.01); *F15B 2211/40507* (2013.01); *F15B 2211/40584* (2013.01); *F15B 2211/40592* (2013.01); *F15B 2211/41527* (2013.01); *F15B 2211/41536* (2013.01); *F15B 2211/426* (2013.01); *F15B 2211/6654* (2013.01); *F15B 2211/7053* (2013.01); *F15B 2211/75* (2013.01); *F15B 2211/755* (2013.01); *F15B 2211/853* (2013.01)

(58) Field of Classification Search
CPC ...... F15B 2211/6654; F15B 2211/7053; F15B 2211/75; F15B 2211/755; F15B 2211/853
See application file for complete search history.

(56) References Cited

U.S. PATENT DOCUMENTS

| | | | | |
|---|---|---|---|---|
| 2,376,519 | A * | 5/1945 | Stacy | B30B 15/16 91/461 |
| 2,857,886 | A * | 10/1958 | Williams | F15B 11/044 91/518 |
| 3,608,431 | A * | 9/1971 | Pease, III | F15B 11/064 91/1 |
| 3,802,318 | A | 4/1974 | Sibbald | |
| 4,018,136 | A * | 4/1977 | Kaetterhenry | F15B 11/08 91/449 |
| 4,393,764 | A * | 7/1983 | Viaud | A01F 15/0883 100/88 |
| 5,284,083 | A | 2/1994 | Vaslin | |
| 10,378,260 | B2 | 8/2019 | Smith | |
| 10,641,299 | B2 * | 5/2020 | Giesler | F15B 15/2807 |
| 2015/0143791 | A1 | 5/2015 | Smith et al. | |
| 2015/0272007 | A1 * | 10/2015 | Smith | A01D 90/10 414/24.5 |
| 2017/0290271 | A1 | 10/2017 | Jones et al. | |

FOREIGN PATENT DOCUMENTS

| | | |
|---|---|---|
| EP | 2875716 A1 | 5/2015 |
| GB | 1582675 A | 1/1981 |
| JP | S63163503 U | 10/1988 |
| WO | WO2019030704 A1 | 2/2019 |

OTHER PUBLICATIONS

Extended European Search Report and Written Opinion issued in European Patent Application No. 21167875.0, dated Sep. 22, 2021, 8 pages.

* cited by examiner

HYDRAULIC DAMPENING SYSTEM FOR A REAR GATE OF A ROUND BALER

TECHNICAL FIELD

The disclosure generally relates to a hydraulic system for a baler implement.

BACKGROUND

A baler implement, e.g., a round baler, includes a body and a rear gate rotatably attached to the body. The body forms a baling chamber within which crop material is formed into a bale. The rear gate is moveable between a closed position for forming the bale, an open position for discharging the bale from the baling chamber, and at least one intermediate position disposed between the open position and the closed position. A hydraulic system is used to actuate the rear gate. The hydraulic system includes a hydraulic cylinder that interconnects the body and the rear gate. The hydraulic cylinder extends and retracts in response to a fluid signal to move the rear gate between the open position and the closed position. The speed at which the rear gate moves is dependent upon the flow rate of the fluid signal to and/or from the hydraulic cylinder.

SUMMARY

A hydraulic system for operating a rear gate of a baler implement is provided. The hydraulic system includes a tank that is operable to store a supply of a fluid, and a pump that is disposed in fluid communication with the tank and that is operable to circulate the fluid through a fluid circuit. The hydraulic system further includes a hydraulic cylinder. The hydraulic cylinder has a housing that defines an interior, and a piston that is moveably disposed within the interior of the housing. The housing and the piston cooperate to define a first fluid volume on a first side of the piston and a second fluid volume on an opposing second side of the piston. The housing includes a first fluid port and a second fluid port, with each of the first fluid port and the second fluid port disposed in fluid communication with the first fluid volume of the hydraulic cylinder. A flow rate control valve is moveable between a first position for directing fluid to or from the first fluid port at a first flow rate, and a second position for directing fluid to or from the second fluid port at a second flow rate. The second flow rate is different than the first flow rate.

In one aspect of the disclosure, the baler implement includes a body forming a baling chamber. The rear gate is rotatably attached to the body and rotatable about a gate axis between a closed position, an open position, and at least one intermediate position disposed between the closed position and the open position.

In one aspect of the disclosure, the fluid circuit includes a first circuit portion, a first branch line, and a second branch line. The first circuit portion is disposed in selective fluid communication with one of the pump and the tank. The first branch line is connected to and in fluid communication with the first circuit portion and the first fluid port of the hydraulic cylinder. The second branch line is connected to and in fluid communication with the first circuit portion and the second fluid port of the hydraulic cylinder. In one implementation, the first branch line includes the flow rate control valve.

In one aspect of the disclosure, the second branch line may include a structure and/or feature that reduces or restricts fluid flow through the fluid circuit. For example, in one implementation, the second branch line may include a flow restriction, e.g., an orifice, which is operable to allow fluid flow through the flow restriction at the second flow rate.

In aspect of the disclosure, the flow rate control valve may include, but is not limited to, a two position spool valve in which fluid communication through the flow rate control valve is allowed at the first flow rate when the flow rate control valve is disposed in the first position, and fluid communication through the flow rate control valve is blocked when the flow rate control valve is disposed in the second position. When the flow rate control valve is positioned in its second position, thereby blocking fluid communication therethrough, fluid flow is forced through the second branch line and the flow restriction therein to provide the fluid flow at the second fluid flow rate. In one implementation, the flow rate control valve is normally biased into the first position.

In one aspect of the disclosure, the second flow rate is less than the first flow rate. In another implementation, however, the second flow rate may be less than the first flow rate.

In one aspect of the disclosure, the housing includes a third fluid port that is disposed in fluid communication with the second fluid volume of the hydraulic cylinder. The fluid circuit includes a second circuit portion in fluid communication with the third fluid port. The second circuit portion is disposed in selective fluid communication with one of the pump and the tank. As such, fluid may be supplied to and/or removed from the first fluid volume of the hydraulic cylinder through the first circuit portion, via either the first fluid port or the second fluid port, and fluid may be supplied to and/or removed from the second fluid volume of the hydraulic cylinder through the second circuit portion, via the third fluid port.

In one aspect of the disclosure, a flow direction control valve is moveable between a first position and a second position. The first position of the flow direction control valve connects the pump and the first circuit portion of the fluid circuit in fluid communication and connects the tank and the second circuit portion of the fluid circuit in fluid communication. The second position of the flow direction control valve connects the first circuit portion of the fluid circuit and the tank in fluid communication and connects the second circuit portion of the fluid circuit and the pump in fluid communication.

In one implementation, the flow direction control valve may further include a third position. The third position of the flow direction control valve directly connects the pump and the tank in fluid communication. The third position of the flow direction control valve blocks fluid communication to both the first circuit portion and the second circuit portion of the fluid circuit from both the pump and the tank.

In one aspect of the disclosure, the hydraulic system includes a controller. The controller is disposed in communication with and operable to control movement of the flow rate control valve between the first position of the flow rate control valve and the second position of the flow rate control valve. Additionally, the controller is disposed in communication with and operable to control movement of the flow direction control valve between at least the first position of the flow direction control valve and the second position of the flow direction control valve.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
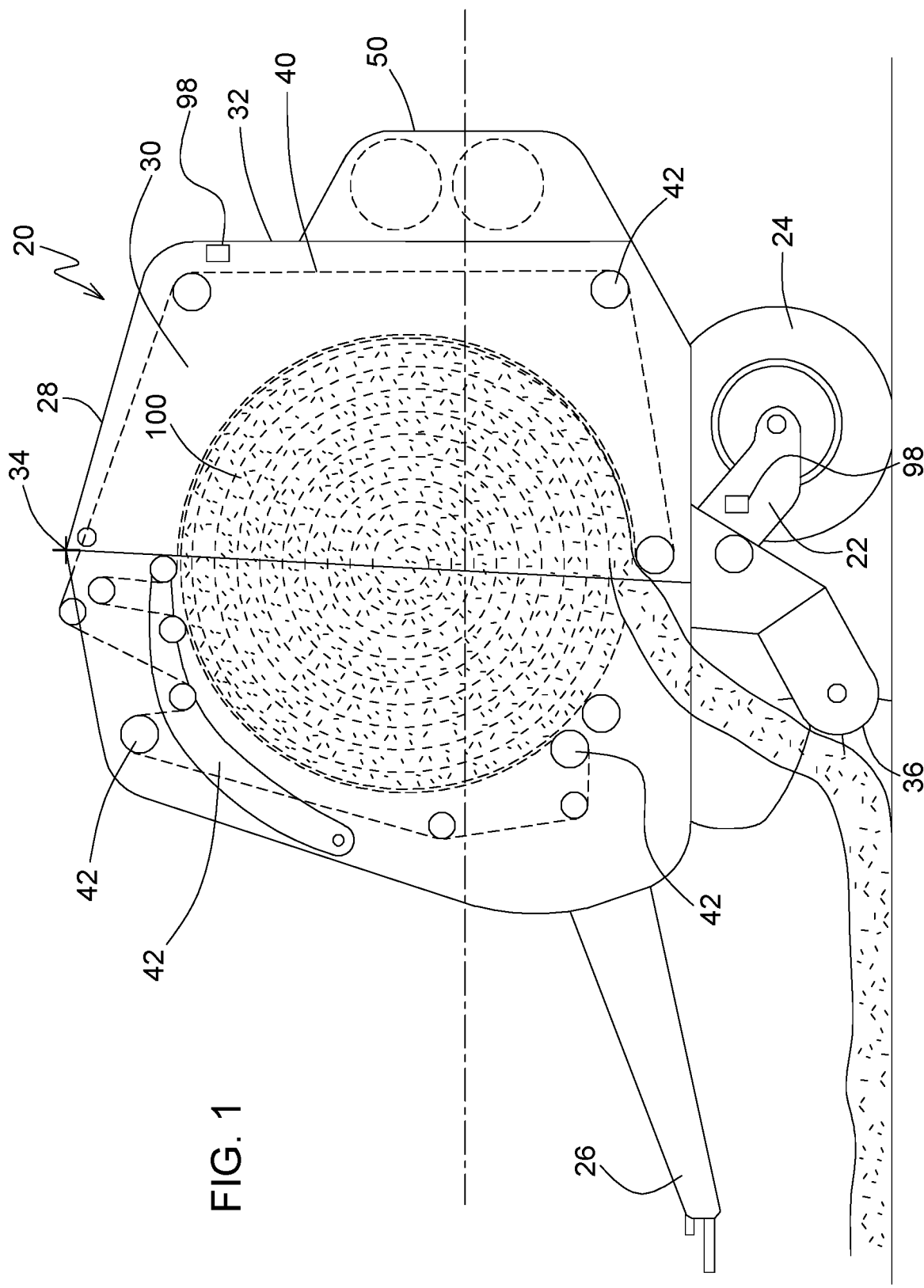
FIG. 1 is a schematic side view of a baler implement.

Referring to the Figures, wherein like numerals indicate like parts throughout the several views, a baler implement is generally shown at 20. The example implementation of the baler implement 20 shown in FIG. 1 is configured as a round baler. The teachings of the disclosure are described below with reference to the features of the example implementation of the baler implement 20 shown in FIG. 1, i.e., the round baler. However, it should be appreciated that the teachings of the disclosure may be applied to other implementations and/or configurations of the baler implement 20 not shown or described herein.

Referring to FIG. 1, the baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the baler implement 20 to a traction unit, such as but not limited to an agricultural tractor. In other implementations, the baler implement 20 may be self-propelled, in which case the traction unit and the baler implement 20 are configured as a single, self-propelled vehicle.

The baler implement 20 includes a housing or body 28 forming a baling chamber 30. The body 28 is attached to and supported by the frame 22. The body 28 may include one or more walls or panels that at least partially enclose and/or define the baling chamber 30. The baler implement 20 further includes a rear gate 32. The rear gate 32 is attached to and rotatably supported by the body 28. The rear gate 32 is positioned adjacent a rearward end of the frame 22 and is pivotably moveable about a gate axis 34. The gate axis 34 is generally horizontal and perpendicular to a central longitudinal axis of the frame 22. The rear gate 32 is moveable between a closed position for forming a bale 100 within the baling chamber 30, and an open position for discharging the bale 100 from the baling chamber 30. The rear gate 32 is further moveable to at least one intermediate position disposed between the open position and the closed position.

The baler implement 20 includes a pick-up 36 disposed proximate the forward end of the frame 22. The pickup gathers crop material from a ground surface and directs the gathered crop material toward and into an inlet of the baling chamber 30. The pickup may include, but is not limited to tines, forks, augers, conveyors, baffles, etc., for gathering and moving the crop material. The baler implement 20 may be equipped with a pre-cutter (not shown), disposed between the pickup and the inlet. As such, the pre-cutter is disposed downstream of the pickup and upstream of the inlet relative to a direction of travel of the crop material. The pre-cutter cuts or chops the crop material into smaller pieces.

The baler implement 20 may be configured as a variable chamber baler, or as a fixed chamber baler. The baler implement 20 shown in the Figures and described herein is depicted and described as a variable chamber baler. As is understood by those skilled in the art, the variable chamber baler includes a plurality of longitudinally extending side-by-side forming belts 40 that are supported by a plurality of rollers 42. The bale 100 is formed by the forming belts 40 and one or more side walls of the housing.

The crop material is directed through the inlet and into the baling chamber 30, whereby the forming belts 40 roll the crop material in a spiral fashion into the bale 100 having a cylindrical shape. The forming belts 40 apply a constant pressure to the crop material as the crop material is formed into the bale 100. A belt tensioner 44 continuously moves the forming belts 40 radially outward relative to a center of the cylindrical bale 100 as the diameter of the bale 100 increases. The belt tensioner 44 maintains the appropriate tension in the belts to obtain the desired density of the crop material. The belt tensioner 44 is moved by a first tension arm cylinder 46 and a second tension arm cylinder 48, both shown in FIGS. 2-6. The first tension arm cylinder 46 and the second tension arm cylinder 48 extend and retract in response to a hydraulic signal to move the belt tensioner 44.

The baler implement 20 includes a wrap system 50. The wrap system 50 is operable to wrap the bale 100 with a wrap material inside the baling chamber 30. Once the bale 100 is formed to a desired size, the wrap system 50 feeds the wrap material into the baling chamber 30 to wrap the bale 100 and thereby secure the crop material in a tight package and maintain the desired shape of the bale 100. The wrap material may include, but is not limited to, a twine, a net mesh, or a solid plastic wrap. Movement of the gate into the open position simultaneously moves the forming belts 40 clear of the formed bale 100, and allows the formed and wrapped bale 100 to be discharged through the rear of the baling chamber 30.

Figure 2:
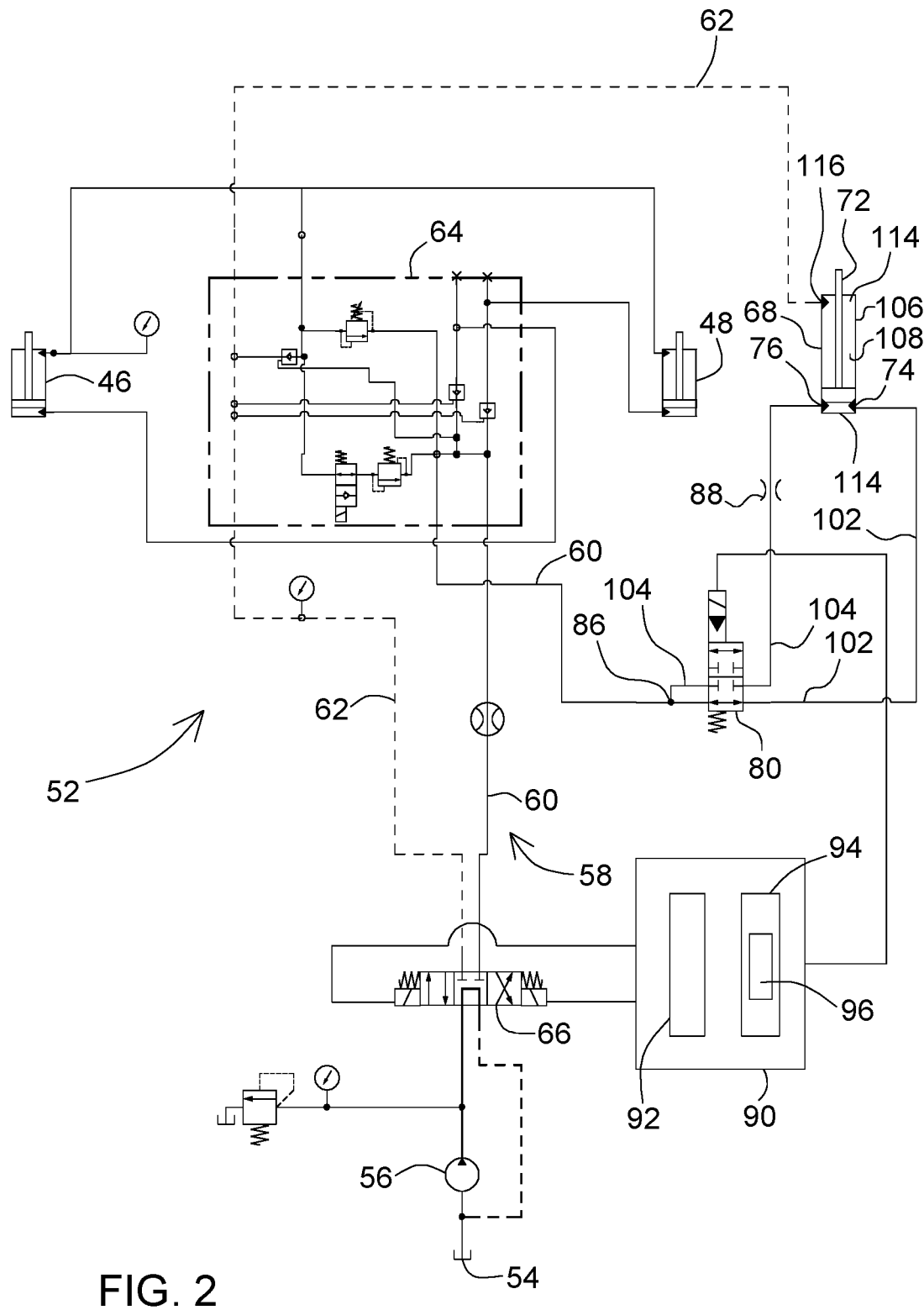
FIG. 2 is a schematic view of a hydraulic system for the baler implement in accordance with the teachings of this disclosure.

Referring to FIG. 2, the baler implement 20 includes a hydraulic system 52. The hydraulic system 52 is configured to operate the rear gate 32 of the baler implement 20. It should be appreciated that the hydraulic system 52 may be configured to operate other features and/or functions of the baler implement 20, such as but not limited to the first tension arm cylinder 46 and the second tension arm cylinder 48.

The hydraulic system 52 includes a tank 54. The tank 54 is operable to store a supply of a fluid, e.g., hydraulic fluid. The tank 54 may alternatively be referred to as a reservoir or container capable of storing the supply of the fluid. A pump 56 is disposed in fluid communication with the tank 54. The pump 56 is operable to pressurize and/or circulate the fluid through a fluid circuit 58. The pump 56 draws the fluid from the tank 54 and circulates the fluid through the fluid circuit 58, through which the fluid is eventually returned to the tank 54. The specific type, configuration, and operation of the pump 56 are known to those skilled in the art, are not pertinent to the teachings of this disclosure, and are therefore not described in detail herein.

The fluid circuit 58 includes a plurality of fluid passageways or portions that are connected together. The fluid passageways may include and be defined by individual components or combinations of components, including but are not limited to, rigid pipes, flexible hoses, connections, fittings, valves, valve bodies, etc. The fluid circuit 58 includes at least a first circuit portion 60, a second circuit portion 62, a first branch line 102, and a second branch line 104 described in greater detail below. While the fluid circuit 58 may include other fluid passageways, such as those leading to and from a tension arm valve body 64, the first tension arm cylinder 46, or the second tension arm cylinder 48, these other fluid passageways are not pertinent to the teachings of this disclosure, and are therefore not described in detail herein.

The hydraulic system 52 includes a flow direction control valve 66. The flow direction control valve 66 may alternatively be referred to herein as the second control valve. The flow direction control valve 66 is moveable between a first position and a second position to control the direction of fluid flow through the first circuit portion 60 and the second circuit portion 62 of the fluid circuit 58. When the flow direction control valve 66 is disposed in its first position, the flow direction control valve 66 connects the pump 56 and the first circuit portion 60 of the fluid circuit 58 in fluid communication and connects the tank 54 and the second circuit portion 62 of the fluid circuit 58 in fluid communication. When the flow direction control valve 66 is disposed in its second position, the flow direction control valve 66 connects the first circuit portion 60 of the fluid circuit 58 and the tank 54 in fluid communication and the second circuit portion 62 of the fluid circuit 58 and the pump 56 in fluid communication.

As shown in FIG. 2, the flow direction control valve 66 further includes a third position. When the flow direction control valve 66 is disposed in its third position, the flow direction control valve 66 directly connects the pump 56 and the tank 54 in fluid communication and blocks fluid communication to both the first circuit portion 60 and the second circuit portion 62 of the fluid circuit 58 from both the pump 56 and the tank 54.

The flow direction control valve 66 may include a three-position spool valve or some other equivalent valve structure. In the implementation described herein, the flow direction control valve 66 is normally biased into the third position. The flow direction control valve 66 may include one or more electrically actuated solenoids and/or biasing devices, e.g., springs, to move the flow direction control valve 66 between the different positions of the flow direction control valve 66. It should be appreciated that other valve types and/or combination of valves may be used to provide the functionality of the flow direction control valve 66 described herein.

The baler implement 20 includes at least one hydraulic gate cylinder 68. While the example implementation shown in FIGS. 2-6 includes only one hydraulic gate cylinder 68, it should be appreciated that the hydraulic system 52 may include multiple hydraulic gate cylinders 68. As shown in FIGS. 2-6, the hydraulic gate cylinder 68 includes a housing 106 defining an interior 108 and a piston 110 moveably disposed within the interior 108 of the housing 106. The housing 106 and the piston 110 cooperating to define a first fluid volume 112 on a first side of the piston 110 and a second fluid volume 114 on an opposing second side of the piston 110. A rod 72 is fixedly attached to and moveable with the piston 110. The housing 106 defines a first fluid port 74, a second fluid port 76, and a third fluid port 116. Both the first fluid port 74 and the second fluid port 76 are disposed in fluid communication with the first fluid volume 112 of the hydraulic gate cylinder 68. The third fluid port 116 is disposed in fluid communication with the second fluid volume 114 of the hydraulic gate cylinder 68.

The hydraulic gate cylinder 68 is operable to extend and retract the rod 72 relative to the housing 106 to raise and lower the rear gate 32. For example, fluid flow into the first fluid volume 112 and out of the second fluid volume 114 moves the piston 110 and the rod 72 in a first direction to extend the hydraulic gate cylinder 68 and raise the rear gate 32. In contrast, fluid flow into the second fluid volume 114 and out of the first fluid volume 112 moves the piston 110 and the rod 72 in an opposite second direction to retract the hydraulic gate cylinder 68 and lower the rear gate 32.

The first circuit portion 60 is disposed in selective fluid communication with one of the pump 56 and the tank 54, via the flow direction control valve 66. The first branch line 102 is connected to and in fluid communication with the first circuit portion 60. The first branch line 102 is further attached and/or directly connected to the first fluid port 74 of the hydraulic gate cylinder 68. The second branch line 104 is connected to and in fluid communication with the first circuit portion 60. The second branch line 104 is further attached and/or directly connected to the second fluid port 76 of the hydraulic gate cylinder 68. A flow rate control valve 80 is positioned between a location 86 at which the first circuit portion 60 and the second branch line 104 are connected, and the first fluid port 74 of the hydraulic gate cylinder 68. The flow rate control valve 80 may alternatively be referred to herein as the first control valve.

The flow rate control valve 80 is selectively moveable between a first position and a second position. When the flow rate control valve 80 is disposed in its first position, the flow rate control valve 80 allows full fluid communication through the first branch line 102 to direct fluid to or from the first fluid port 74 at a first flow rate, to move the rear gate 32 at a first speed. Simultaneously, when the flow rate control valve 80 is disposed in its first position, the flow rate control valve 80 closes fluid communication through the second branch line 104. When the flow rate control valve 80 is disposed in its second position, the flow rate control valve 80 closes fluid communication through the first branch line 102 and opens fluid communication through the second branch line 104 to direct fluid through the second branch line 104 and to or from the second fluid port 76 at a second flow rate, to move the rear gate 32 at a second speed.

In one implementation, the flow rate control valve 80 is a two-position spool valve or an equivalent valve assembly. In the implementation described herein, the flow rate control valve 80 is normally biased into its first position. The flow rate control valve 80 may include an electrically controlled solenoid that actuates an internal hydraulic pilot to move between the first and second position of the flow rate control valve 80. It should be appreciated that the flow rate control valve 80 may differ from the example implementation shown in the Figures and described herein. For example, the flow rate control valve 80 may include a proportional valve to vary the fluid flow rate therethrough. It should be appreciated that other valve types and/or combination of valves may be used to provide the functionality of the flow rate control valve 80 described herein.

A flow restriction 88 may be disposed within the second branch line 104. The flow restriction 88 may include an orifice plate or some other equivalent structure capable of restricting the fluid flow through the second branch line 104 to a rate that is different from, e.g., less than, a fluid flow rate through the flow rate control valve 80 and the first branch portion 102 when disposed in its first position. The flow restriction 88 may alternatively include a fluid passageway, e.g., hose or rigid pipe, etc., having a smaller cross sectional area relative to the cross sectional area of the first circuit portion 60 of the fluid circuit 58, thereby restricting fluid flow through the second branch line 104 relative to the fluid flow through the first branch line 102.

The second circuit portion 62 is disposed in selective fluid communication with one of the pump 56 and the tank 54 via the flow direction control valve 66. The second circuit portion 62 is attached and/or directly connected to the third fluid port 116.

The baler implement 20 further includes a controller 90. The controller 90 is disposed in communication with and operable to control movement of the flow rate control valve 80 between the first position of the flow rate control valve 80 and the second position of the flow rate control valve 80. Additionally, the controller 90 is disposed in communication with and operable to control movement of the flow direction control valve 66 between at least the first position of the flow direction control valve 66 and the second position of the flow direction control valve 66. The controller 90 may be configured to send a control signal, such as but not limited to an electrical signal, to the flow rate control valve 80 and/or the flow direction control valve 66 to move each between their respective positions.

The controller 90 may alternatively be referred to as a computing device, a computer, a module, a control module, a control unit, etc. The controller 90 is operable to control the operation of the flow rate control valve 80 and the flow direction control valve 66. The controller 90 includes a processor 92, a memory 94, and all software, hardware, algorithms, connections, sensors 98, etc., necessary to manage and control the operation of the flow rate control valve 80 and the flow direction control valve 66. As such, a method may be embodied as a program or algorithm operable on the controller 90. It should be appreciated that the controller 90 may include any device capable of analyzing data from various sensors, comparing data, making the necessary decisions required to control the operation of the flow rate control valve 80 and the flow direction control valve 66, and executing the required tasks necessary to control the operation of the flow rate control valve 80 and the flow direction control valve 66.

The controller 90 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 94 may include any non-transitory/tangible medium which participates in providing data or computer-readable instructions. The memory 94 may be non-volatile or volatile. Non-volatile media may include, for example, optical or magnetic disks and other persistent memory. Example volatile media may include dynamic random access memory (DRAM), which may constitute a main memory. Other examples of embodiments for the memory 94 may include a floppy, flexible disk, or hard disk, magnetic tape or other magnetic medium, a CD-ROM, DVD, and/or any other optical medium, as well as other possible memory devices such as flash memory.

The controller 90 includes the tangible, non-transitory memory 94 on which are recorded computer-executable instructions, including a valve control algorithm 96. The processor 92 of the controller 90 is configured for executing the valve control algorithm 96. The valve control algorithm 96 implements a method of controlling the flow direction control valve 66 and the flow rate control valve 80.

The flow direction control valve 66 is controllable into the first position of the flow direction control valve 66 to extend the rod 72 and raise the rear gate 32. When disposed in its first position, the flow direction control valve 66 directs the fluid from the pump 56, through the first circuit portion 60 of the fluid circuit 58 and into either the first branch line 102 and the first fluid port 74 or the second branch line 104 and the second fluid port 76, while directing fluid from the third fluid port 116 through the second circuit portion 62 of the fluid circuit 58 to the tank 54. The flow direction control valve 66 is controllable into the second position of the flow direction control valve 66 to retract the rod 72 and lower the rear gate 32. When disposed in its second position, the flow direction control valve 66 directs the fluid from the pump 56, through the second circuit portion 62 of the fluid circuit 58 and into the third fluid port 116, while directing fluid from the first fluid volume, through either the first fluid port 74 and the first branch line 102 or the second fluid port 76 and the second branch line 104, through the first circuit portion 60 of the fluid circuit 58 to the tank 54.

The flow rate control valve 80 is controllable into the first position of the flow rate control valve 80 to provide a first fluid flow rate through the first branch line 102 of the fluid circuit 58 to move the rear gate 32 at a first speed. When disposed in its first position, the flow rate control valve 80 directs fluid flow through the flow rate control valve 80 and the first branch line 102 at the first fluid rate. The flow rate control valve 80 is controllable into the second position of the flow rate control valve 80 to provide a second fluid flow rate through the second branch line 104 of the fluid circuit 58 to move the rear gate 32 at a second speed. When the flow rate control valve 80 is disposed in its second position, the flow rate control valve 80 closes fluid communication through the first branch line 102, and directs fluid flow through the flow rate control valve 80, the second branch line 104 and through the flow restriction 88 at the second fluid flow rate. Because of the flow restriction 88, the second fluid flow rate and the second speed are less than the first fluid flow rate and the first speed respectively. The flow rate control valve 80 may be controlled to either its first position or its second position, regardless of the direction of fluid flow through the first circuit portion 60 of the fluid circuit 58, i.e., regardless of whether the flow direction control valve 66 is disposed in its first position for raising the rear gate 32 or its second position for lowering the rear gate 32.

Figure 3:
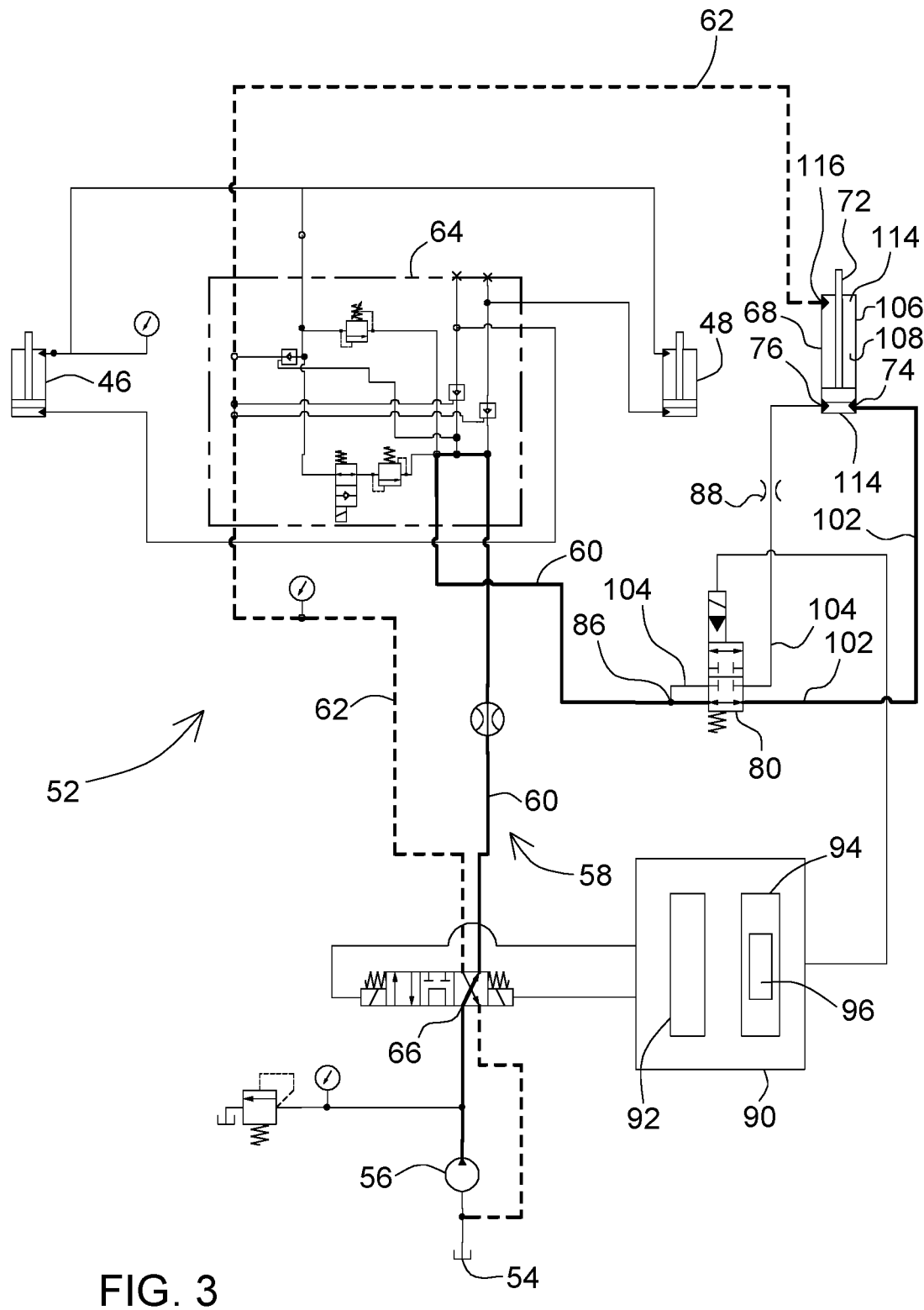
FIG. 3 is a schematic view of the hydraulic system in a first configuration of the hydraulic system shown in FIG. 2.
Figure 4:
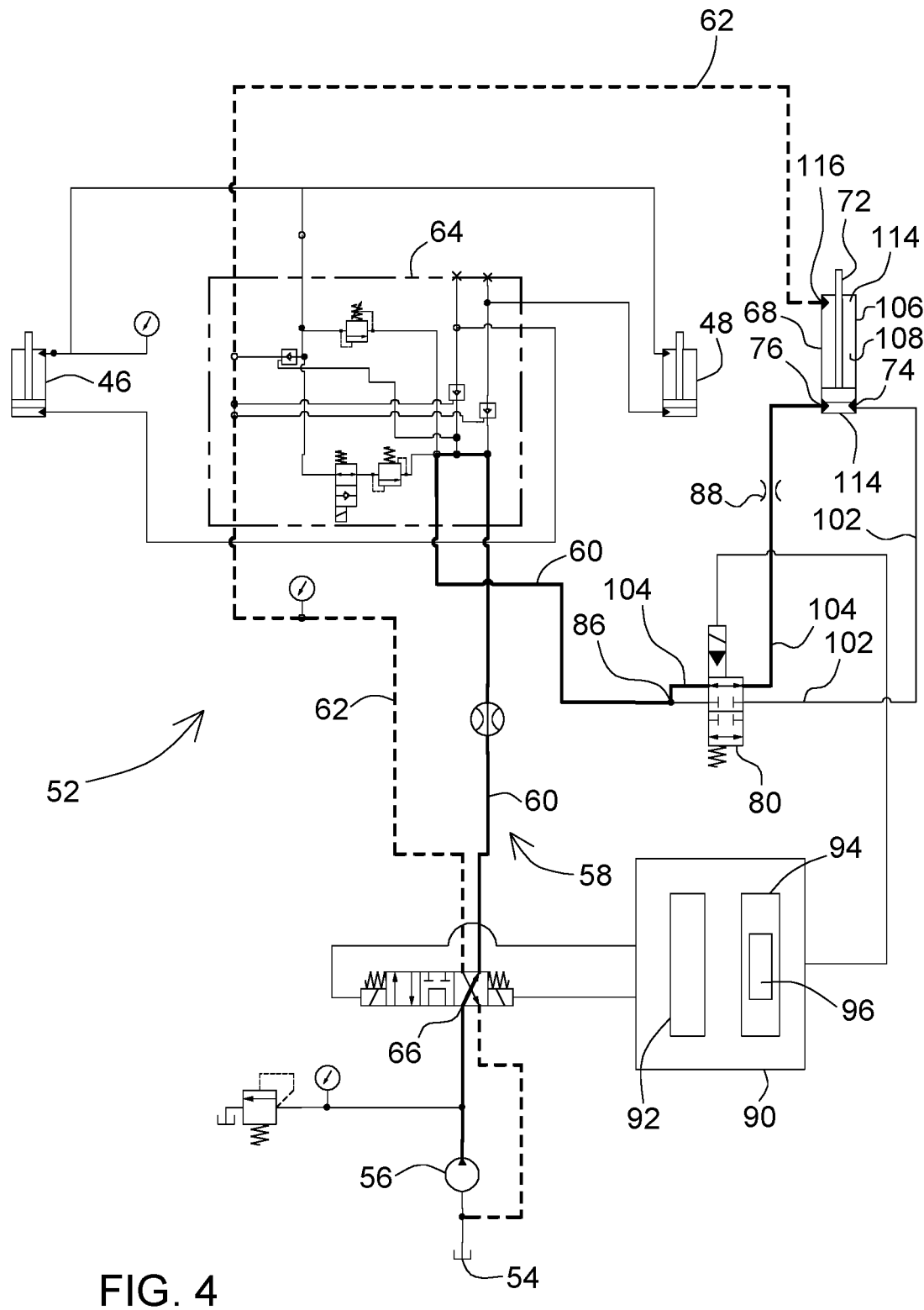
FIG. 4 is a schematic view of the hydraulic system in a second configuration of the hydraulic system shown in FIG. 2.
Figure 5:
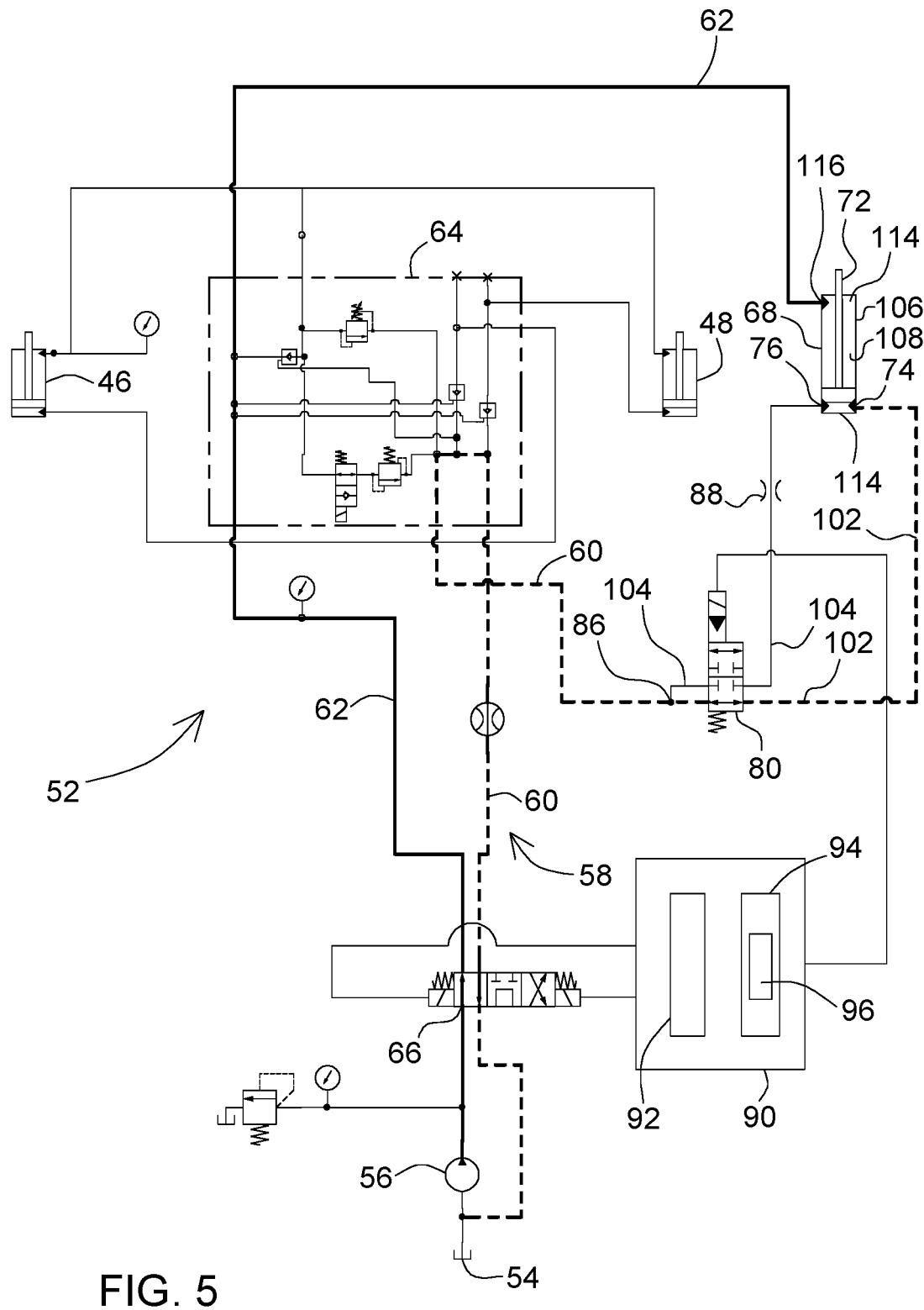
FIG. 5 is a schematic view of the hydraulic system in a third configuration of the hydraulic system shown in FIG. 2.
Figure 6:
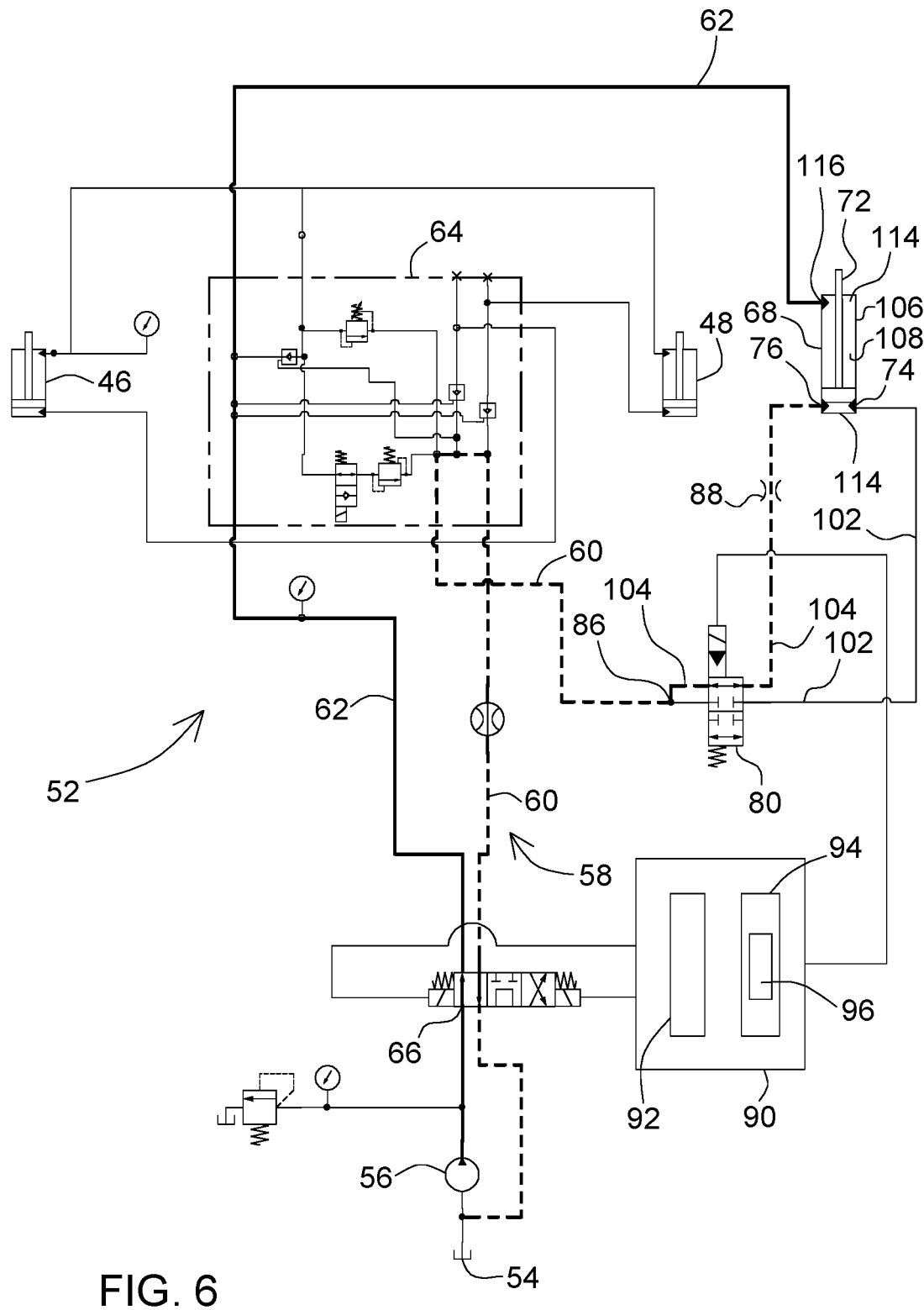
FIG. 6 is a schematic view of the hydraulic system in a fourth configuration of the hydraulic system shown in FIG. 2.

FIGS. 3-6 show the first implementation of the hydraulic system 52 shown in FIG. 2 configured for different operations. Within FIGS. 3-6, pressurized fluid from the pump 56 is shown in thick solid lines, whereas fluid returning to tank 54 is shown in thick dashed lines. FIG. 3 shows the hydraulic system 52 in a first configuration, in which the hydraulic system 52 is configured to raise the rear gate 32 at a first speed. FIG. 4 shows the hydraulic system 52 in a second configuration, in which the hydraulic system 52 is configured to raise the rear gate 32 at a second speed. FIG. 5 shows the hydraulic system 52 in a third configuration, in which the hydraulic system 52 is configured to lower the rear gate 32 at a first speed. FIG. 6 shows the hydraulic system 52 in fourth configuration, in which the hydraulic system 52 is configured to lower the rear gate 32 at a second speed.

Referring to FIG. 3, the flow direction control valve 66 is shown controlled into the first position of the flow direction control valve 66, and the flow rate control valve 80 is shown controlled into the first position of the flow rate control valve 80. In this configuration, pressurized fluid from the pump 56 is directed through the first circuit portion 60 of the fluid circuit 58 to the first branch line 102, through the flow rate control valve 80, and to the first fluid port 74 of the hydraulic gate cylinder 68. Fluid communication through the second branch line 104 is blocked, such that no fluid flows through the second fluid port 76. Fluid from the third fluid port 116 of the hydraulic gate cylinders 68 is directed through the second circuit portion 62 of the fluid circuit 58 back to the tank 54. The flow rate control valve 80 is positioned in its first position, such that the fluid moving through the first branch line 102 moves directly through the flow rate control valve 80 at the first fluid flow rate. In this configuration, the rear gate 32 is moved toward the open position at the first speed.

Referring to FIG. 4, the flow direction control valve 66 is shown controlled into the first position of the flow direction control valve 66, and the flow rate control valve 80 is shown controlled into the second position of the flow rate control valve 80. In this configuration, pressurized fluid from the pump 56 is directed through the first circuit portion 60 of the fluid circuit 58 to the second branch line 104 and then to the second fluid port 76 of the hydraulic gate cylinder 68. Fluid flow through the first branch line 102 is blocked, such that no fluid flows through the first fluid port 74. Fluid from the third fluid port 116 of the hydraulic gate cylinder 68 is directed through the second circuit portion 62 of the fluid circuit 58 back to the tank 54. The flow rate control valve 80 is positioned in its second position, such that the fluid moving through the first branch line 102 is blocked by the flow rate control valve 80. Fluid is directed through the second branch line 104 and the flow restriction 88 included therein at the second fluid flow rate. In this configuration, the rear gate 32 is moved toward the open position at the second speed.

Referring to FIG. 5, the flow direction control valve 66 is shown controlled into the second position of the flow direction control valve 66, and the flow rate control valve 80 is shown controlled into the first position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the first fluid port 74 of the hydraulic gate cylinder 68 and through the first branch line 102 back to the tank 54. Fluid flow through the second branch line 104 is blocked, such that no fluid flows through the second fluid port 76. The flow rate control valve 80 is positioned in its first position, such that the fluid moving through the first branch line 102 moves directly through the flow rate control valve 80 at the first fluid flow rate. In this configuration, the rear gate 32 is moved toward the closed position at the first speed.

Referring to FIG. 6, the flow direction control valve 66 is shown controlled into the second position of the flow direction control valve 66, and the flow rate control valve 80 is shown controlled into the second position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the second fluid port 76 and the second branch line 104 to the first circuit portion 60 of the fluid circuit 58 and back to the tank 54. The flow rate control valve 80 is positioned in its second position, such that the fluid flow through the first branch line 102 is blocked by the flow rate control valve 80. Fluid flow is directed through the second branch line 104 and the flow restriction 88 included therein at the second fluid flow rate. In this configuration, the rear gate 32 is moved toward the closed position at the second speed.

The flow direction control valve 66 and the flow rate control valve 80 may be controlled into the different configurations described above during different phases of various operations of the baler implement 20. For example, while opening the rear gate 32, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 through the remainder of the travel of the rear gate 32 to slow the speed of the rear gate 32 and move the rear gate 32 into the open position at a slower speed to prevent slamming the rear gate 32 open. Similarly, while closing the rear gate 32, the flow direction control valve 66 and the flow rate control valve 80 may be initially controlled into the third configuration shown in FIG. 5 through most of the travel of the rear gate 32 to move the rear gate 32 at the first speed, and then controlled into the fourth configuration shown in FIG. 6 through the remainder of the travel of the rear gate 32 to slow the speed of the rear gate 32 and move the rear gate 32 into the closed position at a slower speed to prevent slamming the rear gate 32 closed.

In other implementations, the rear gate 32 may be slowed and then stopped, while either opening or closing the rear gate 32, at an intermediate position between the open position and the closed position. For example, while opening the rear gate 32 from the closed position, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 for a period to slow the speed of the rear gate 32, at which time the rear gate 32 may be stopped at an intermediate position by controlling the flow direction control valve 66 into its third position, thereby allowing the baler implement 20 to execute another function, such as but not limited to weighing the bale 100 for example, engaging a push bar, or tightening the tension belts. After, in order to move the rear gate 32 from the intermediate position toward the open position, the flow direction control valve 66 and the flow rate control valve 80 may be initially controlled into the first configuration shown in FIG. 3 through most of the travel of the rear gate 32 to move the rear gate 32 at the first speed, and then controlled into the second configuration shown in FIG. 4 through the remainder of the travel of the rear gate 32 to slow the speed of the rear gate 32 and move the rear gate 32 into the open position at a slower speed to prevent slamming the rear gate 32 open.

The controller 90 may communicate with one or more of the sensors 98. The sensors 98 provide data to the controller 90 related to at least one characteristic of the bale 100. The characteristic of the bale 100 may include, but is not limited to, a position of the bale 100 relative to the baling chamber 30 and/or the rear gate 32, a position of the rear gate 32 relative to the bale 100, a weight of the bale 100, a size of the bale 100, a formation status of the bale 100, a status of the wrap system 50, etc. The controller 90 may initiate at least one of a plurality of different gate control modes to control the rear gate 32 based on the data related to the characteristic of the bale 100.

It should be appreciated that the different gate control modes described above may be combined in sequences that vary form those described above, in order to implement or perform various functions and/or operations of the baler implement. Additionally, it should be appreciated that the baler implement may include additional gate control modes not described herein.

Figure 7:
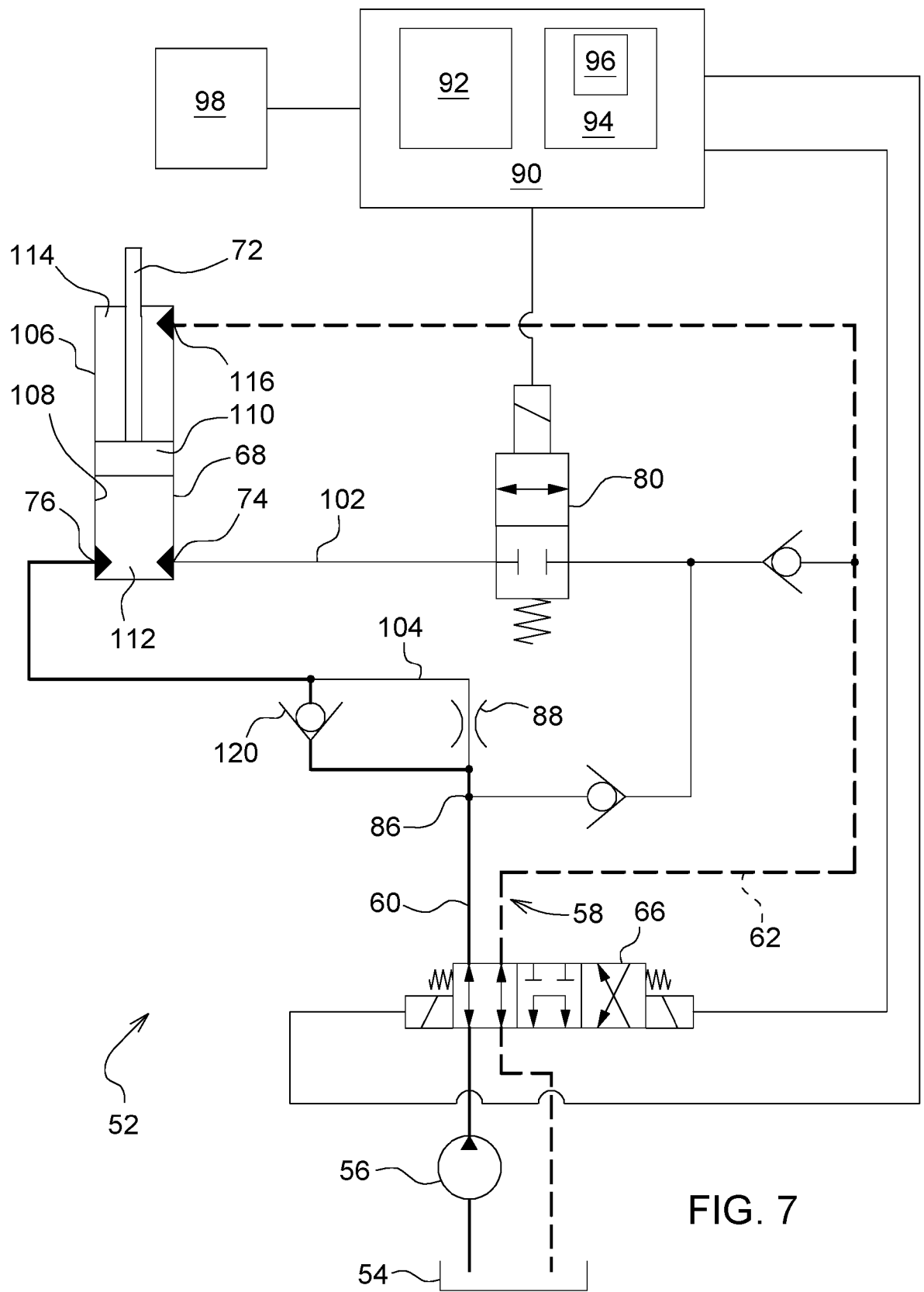
FIG. 7 is a schematic view of a first alternative embodiment of the hydraulic system in accordance with the teachings of this disclosure, shown in a first configuration.
Figure 8:
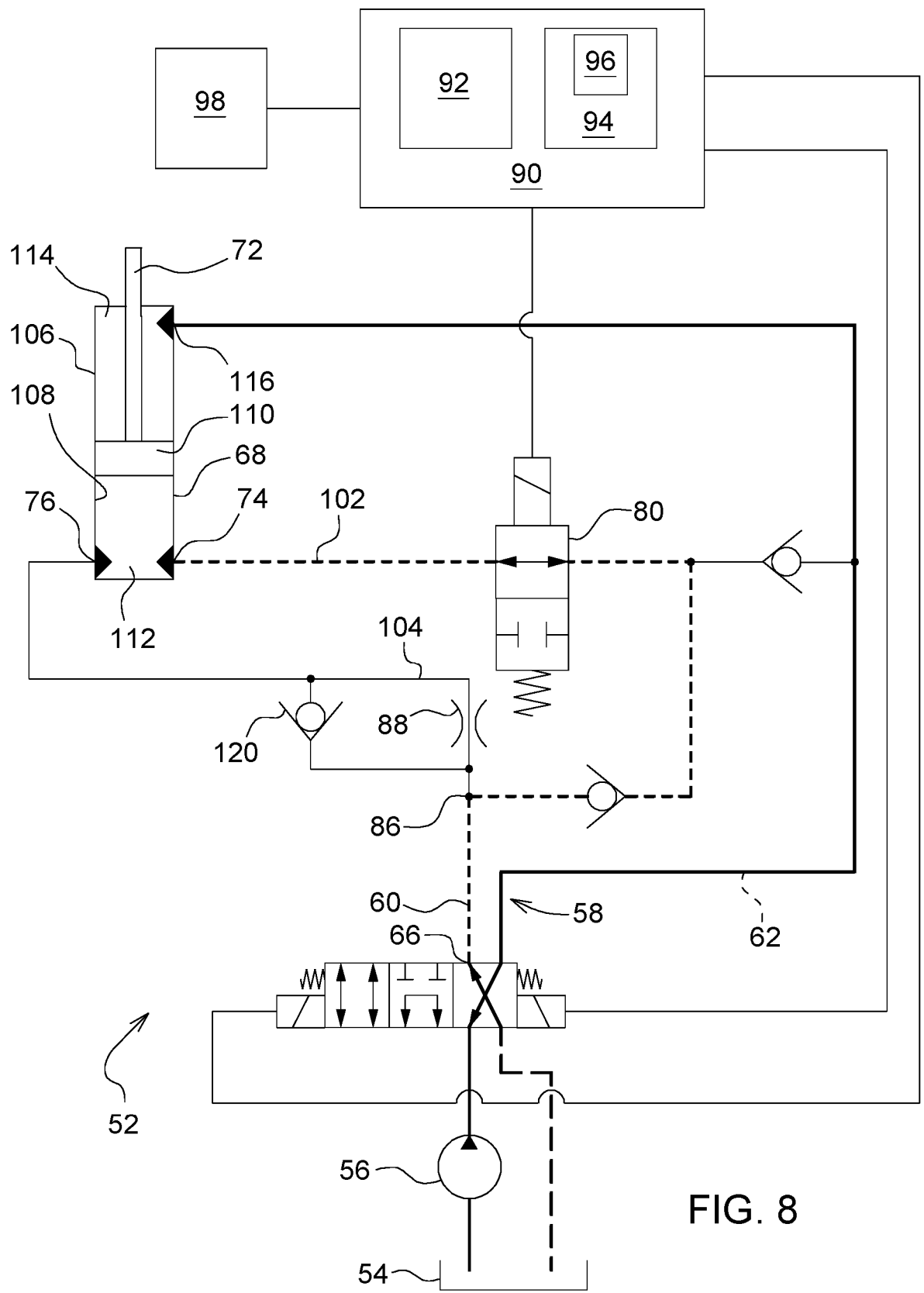
FIG. 8 is a schematic view of the first alternative embodiment of the hydraulic system of FIG. 7, shown in a second configuration.
Figure 9:
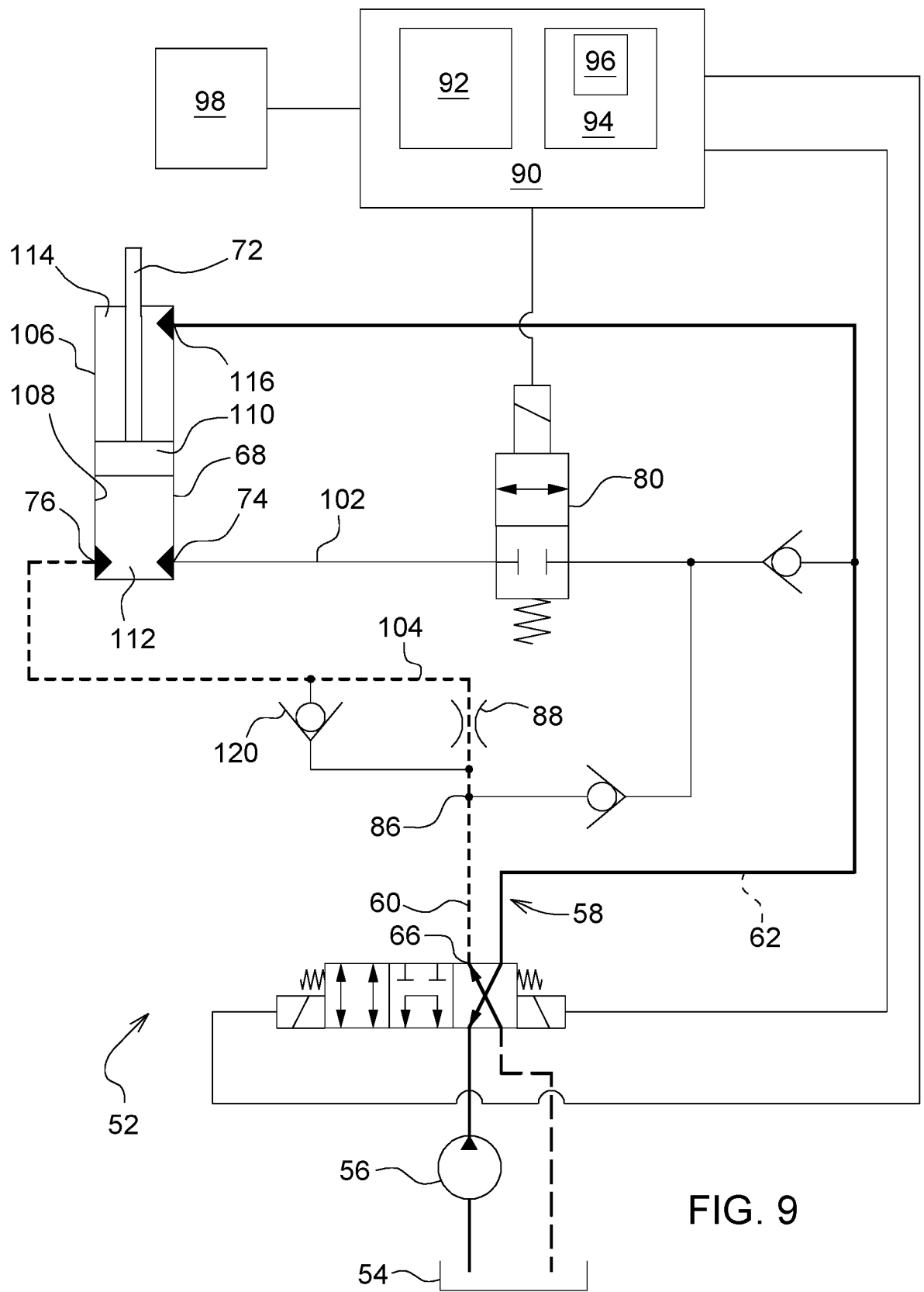
FIG. 9 is a schematic view of the first alternative embodiment of the hydraulic system of FIG. 7, shown in a third configuration.

A first alternative embodiment of the hydraulic system is generally shown in FIGS. 7-9. The reference numerals used to identify the features of the hydraulic system shown in FIGS. 2-6 are used to identify the same features of the hydraulic system shown in FIGS. 7-9. Referring to FIGS. 7-9, the hydraulic system is shown in three different configurations. FIG. 7 shows the hydraulic system configured to raise the rear gate at the first speed. FIG. 8 shows the hydraulic system configured to lower the rear gate at the first speed. FIG. 9 shows the hydraulic system configured to lower the rear gate at the second speed.

Referring to FIG. 7, the flow direction control valve 66 is shown controlled into the first position of the flow direction control valve 66, and the flow rate control valve 80 is shown controlled into the second position of the flow rate control valve 80. In this configuration, pressurized fluid from the pump 56 is directed through the first circuit portion 60 of the fluid circuit 58 to the second branch line 104 and then to the second fluid port 76 of the hydraulic gate cylinder 68. Fluid from the third fluid port 116 of the hydraulic gate cylinder 68 is directed through the second circuit portion 62 of the fluid circuit 58 back to the tank 54. The flow rate control valve 80 is positioned in its second position, such that the fluid moving through the first branch line 102 is blocked by the flow rate control valve 80. Fluid is therefore forced through the second branch line 104. at the first fluid flow rate. In this direction, fluid is free to flow through a check valve 120 at the first fluid flow rate. It should be appreciated that little or minimal fluid may leak through the flow restriction 88. In this configuration, the rear gate 32 is moved toward the open position at the first speed.

Referring to FIG. 8, the flow direction control valve 66 is shown controlled into the second position of the flow direction control valve 66, and the flow rate control valve 80 is shown controlled into the first position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the first fluid port 74 of the hydraulic gate cylinder 68 and through the first branch line 102 back to the tank 54. The flow rate control valve 80 is positioned in its first position, such that the fluid moving through the first branch line 102 moves directly through the flow rate control valve 80 at the first fluid flow rate. Since the flow rate control valve 80 is open, no or only a negligible amount of fluid flows through second fluid port 76 and the second branch line 104, fluid flow through the second branch line 104 being limited by the flow restriction 88. In this configuration, the rear gate 32 is moved toward the closed position at the first speed.

Referring to FIG. 9, the flow direction control valve 66 is shown controlled into the second position of the flow direction control valve 66, and the flow rate control valve 80 is shown controlled into the second position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the second fluid port 76 and the second branch line 104 to the first circuit portion 60 of the fluid circuit 58 and back to the tank 54. The flow rate control valve 80 is positioned in its second position, such that the fluid flow through the first branch line 102 is blocked by the flow rate control valve 80. As such, fluid is forced through the second branch line 104 and the flow restriction 88 included therein at the second fluid flow rate. In this configuration, the rear gate 32 is moved toward the closed position at the second speed.

Figure 10:
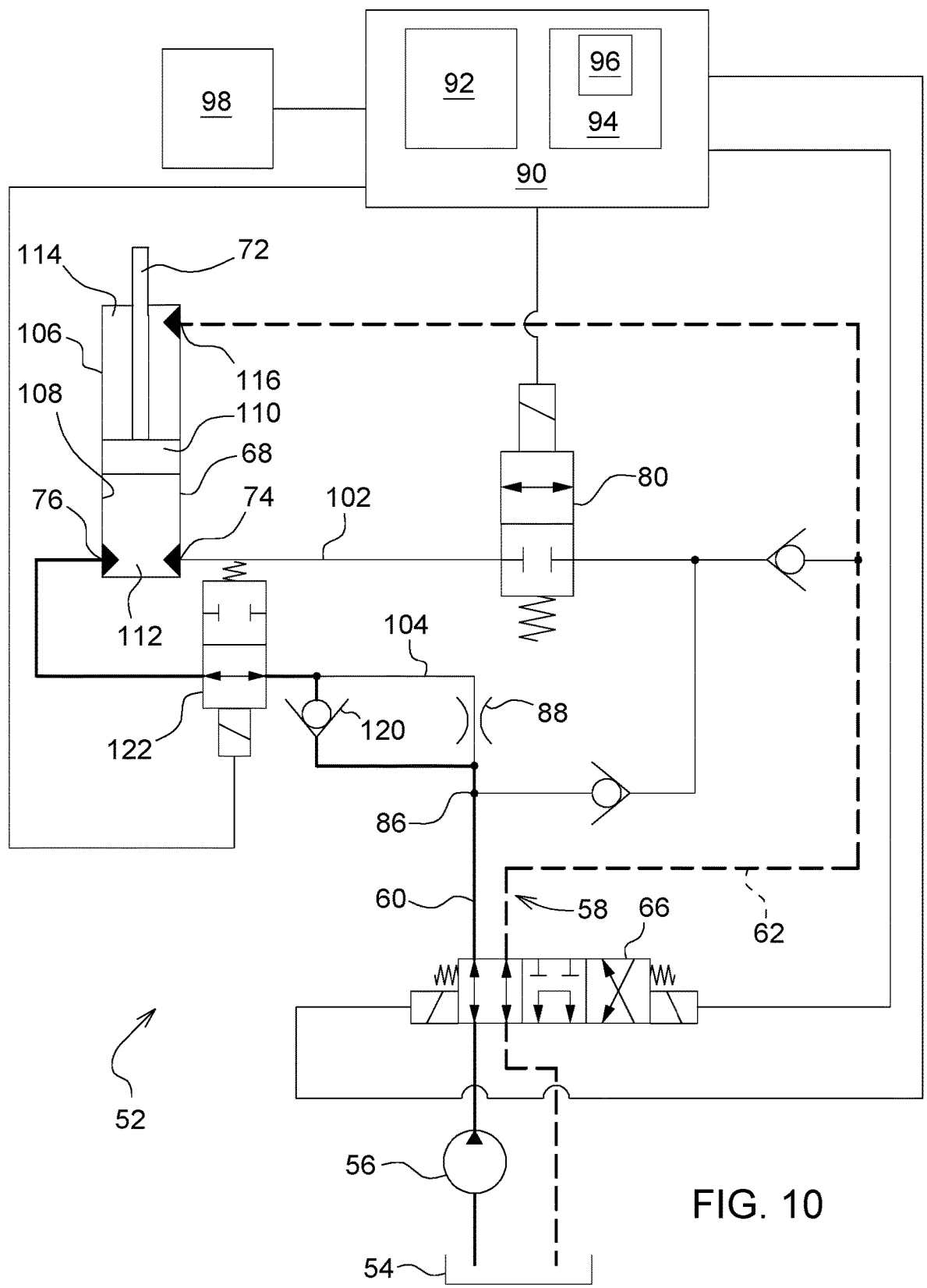
FIG. 10 is a schematic view of a second alternative embodiment of the hydraulic system in accordance with the teachings of this disclosure, shown in a first configuration.
Figure 11:
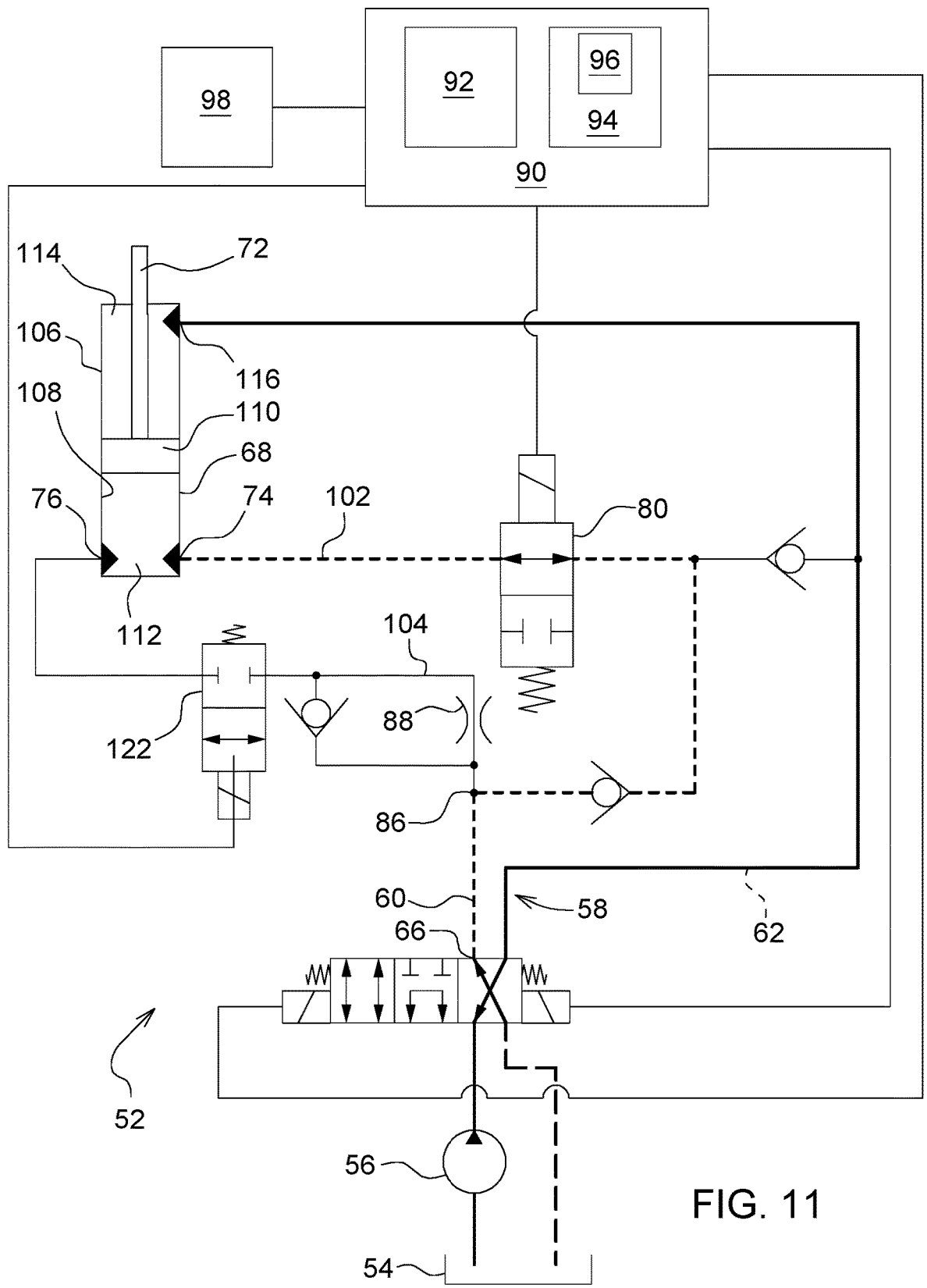
FIG. 11 is a schematic view of the second alternative embodiment of the hydraulic system of FIG. 10, shown in a second configuration.
Figure 12:
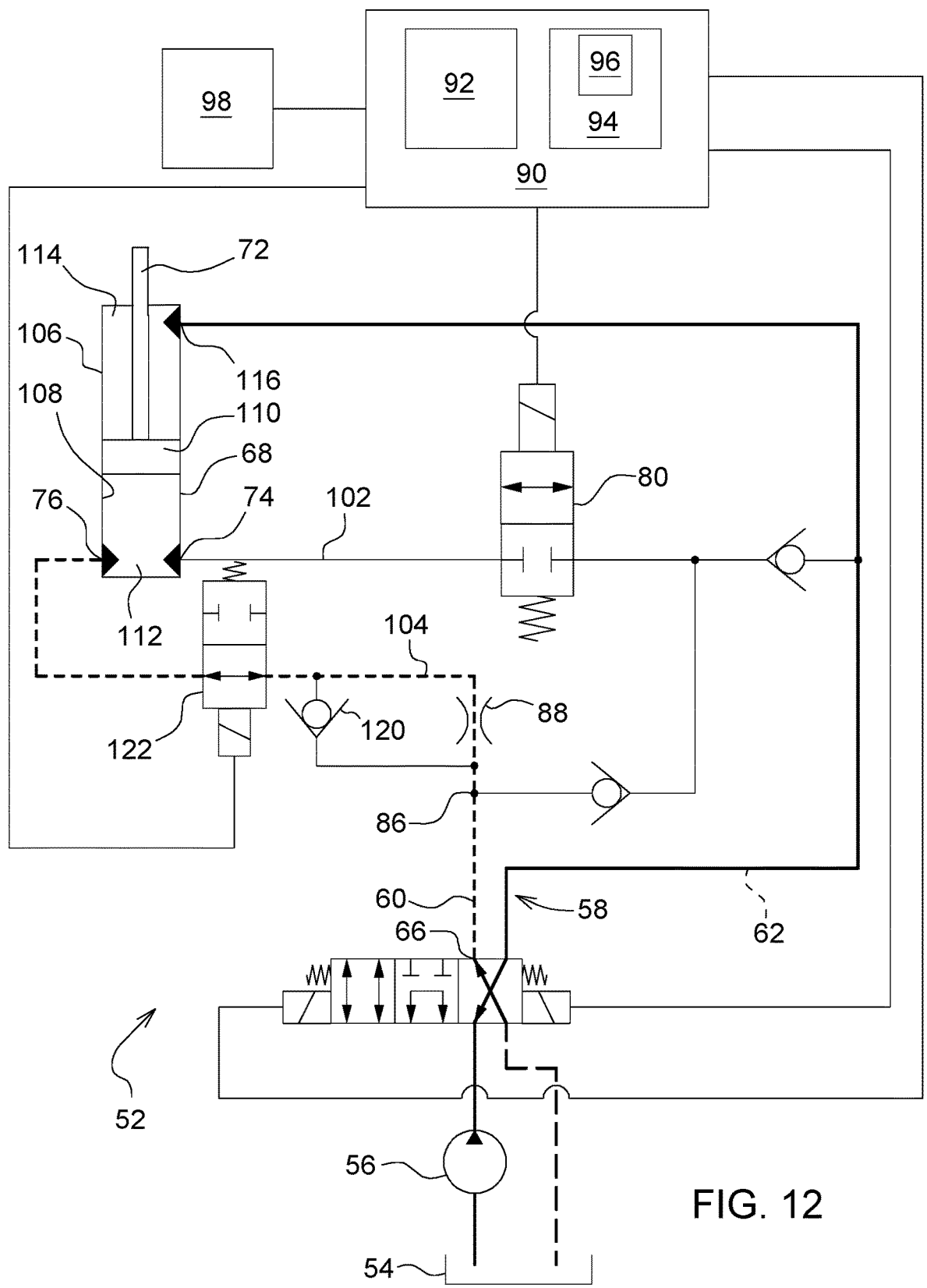
FIG. 12 is a schematic view of the second alternative embodiment of the hydraulic system of FIG. 10, shown in a third configuration.

A second alternative embodiment of the hydraulic system is generally shown in FIGS. 10-12. The reference numerals used to identify the features of the hydraulic system shown in FIGS. 2-6 are used to identify the same features of the hydraulic system shown in FIGS. 10-12. Referring to FIGS. 10-12, the hydraulic system is shown in three different configurations. FIG. 10 shows the hydraulic system configured to raise the rear gate at the first speed. FIG. 11 shows the hydraulic system configured to lower the rear gate at the first speed. FIG. 12 shows the hydraulic system configured to lower the rear gate at the second speed.

Referring to FIG. 10, the flow direction control valve 66 is shown controlled into the first position of the flow direction control valve 66, and the flow rate control valve 80 is shown controlled into the second position of the flow rate control valve 80. In this configuration, pressurized fluid from the pump 56 is directed through the first circuit portion 60 of the fluid circuit 58 to the second branch line 104. A port control valve 122 is disposed in fluid communication with the second branch line 104. The port control valve 122 is moveable between a first position allowing fluid flow through the second branch line 104, and a second position blocking fluid flow through the second branch line 104. As shown in FIG. 10, the port control valve 122 is disposed in its first position, allowing fluid flow through the second branch line 104 and then to the second fluid port 76 of the hydraulic gate cylinder 68. Fluid from the third fluid port 116 of the hydraulic gate cylinder 68 is directed through the second circuit portion 62 of the fluid circuit 58 back to the tank 54. The flow rate control valve 80 is positioned in its second position, such that the fluid moving through the first branch line 102 is blocked by the flow rate control valve 80. In this direction, fluid is free to flow through the check valve 120 at the first fluid flow rate. It should be appreciated that little or minimal fluid may leak through the flow restriction 88. In this configuration, the rear gate 32 is moved toward the open position at the first speed.

Referring to FIG. 11, the flow direction control valve 66 is shown controlled into the second position of the flow direction control valve 66, and the flow rate control valve 80 is shown controlled into the first position of the flow rate control valve 80. The port control valve 122 is controlled into the second position of the port control valve 122. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the first fluid port 74 of the hydraulic gate cylinder 68 and through the first branch line 102 back to the tank 54. The flow rate control valve 80 is positioned in its first position, such that the fluid moving through the first branch line 102 moves directly through the flow rate control valve 80 at the first fluid flow rate. Because the port control valve 122 is positioned in its second position, i.e., its closed position, fluid flow through the second branch line 104 is blocked, and therefore no fluid flows through the second fluid port 76. In this configuration, the rear gate 32 is moved toward the closed position at the first speed.

Referring to FIG. 12, the flow direction control valve 66 is shown controlled into the second position of the flow direction control valve 66, and the flow rate control valve 80 is shown controlled into the second position of the flow rate control valve 80. The port control valve 122 is controlled into the first position of the port control valve 122. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the second fluid port 76 and the second branch line 104 to the first circuit portion 60 of the fluid circuit 58 and back to the tank 54. The port control valve 122 is open allowing fluid flow through the second fluid port 76. The flow rate control valve 80 is positioned in its second position, such that the fluid flow through the first branch line 102 and the first fluid port 74 is blocked by the flow rate control valve 80. As such, fluid is forced through the second branch line 104 and the flow restriction 88 included therein at the second fluid flow rate. In this configuration, the rear gate 32 is moved toward the closed position at the second speed.

Figure 13:
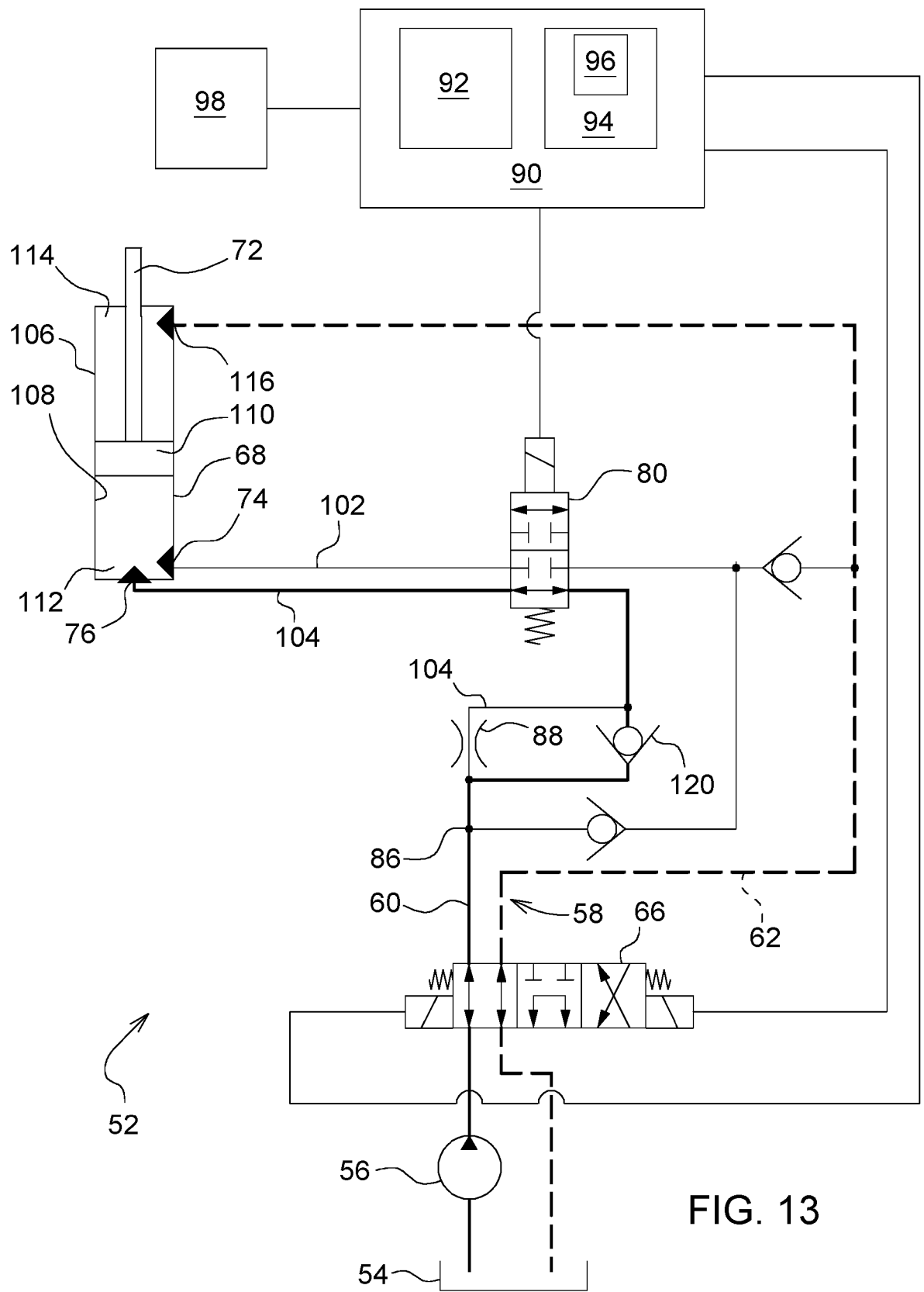
FIG. 13 is a schematic view of a third alternative embodiment of the hydraulic system in accordance with the teachings of this disclosure, shown in a first configuration.
Figure 14:
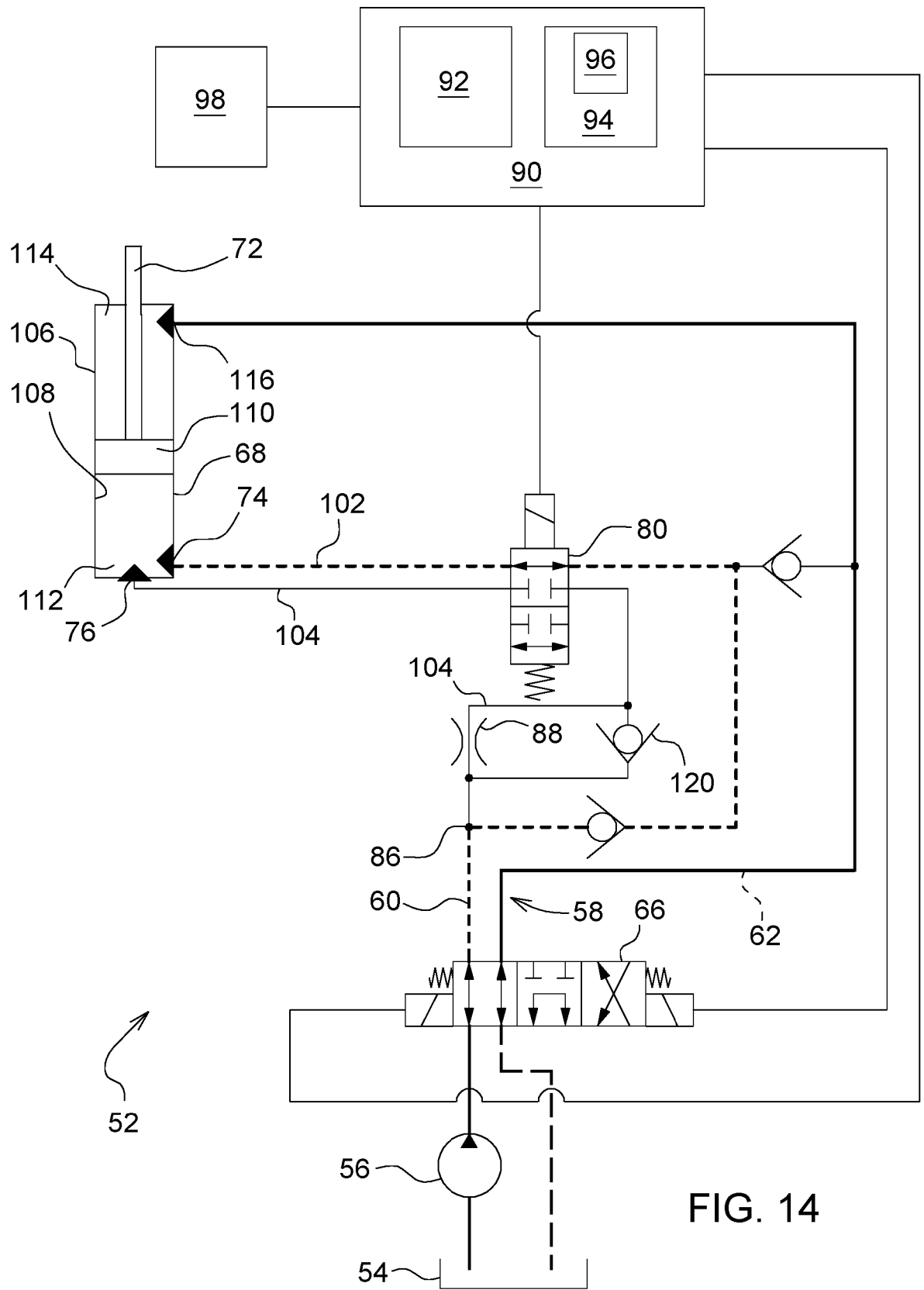
FIG. 14 is a schematic view of the third alternative embodiment of the hydraulic system of FIG. 13, shown in a second configuration.
Figure 15:
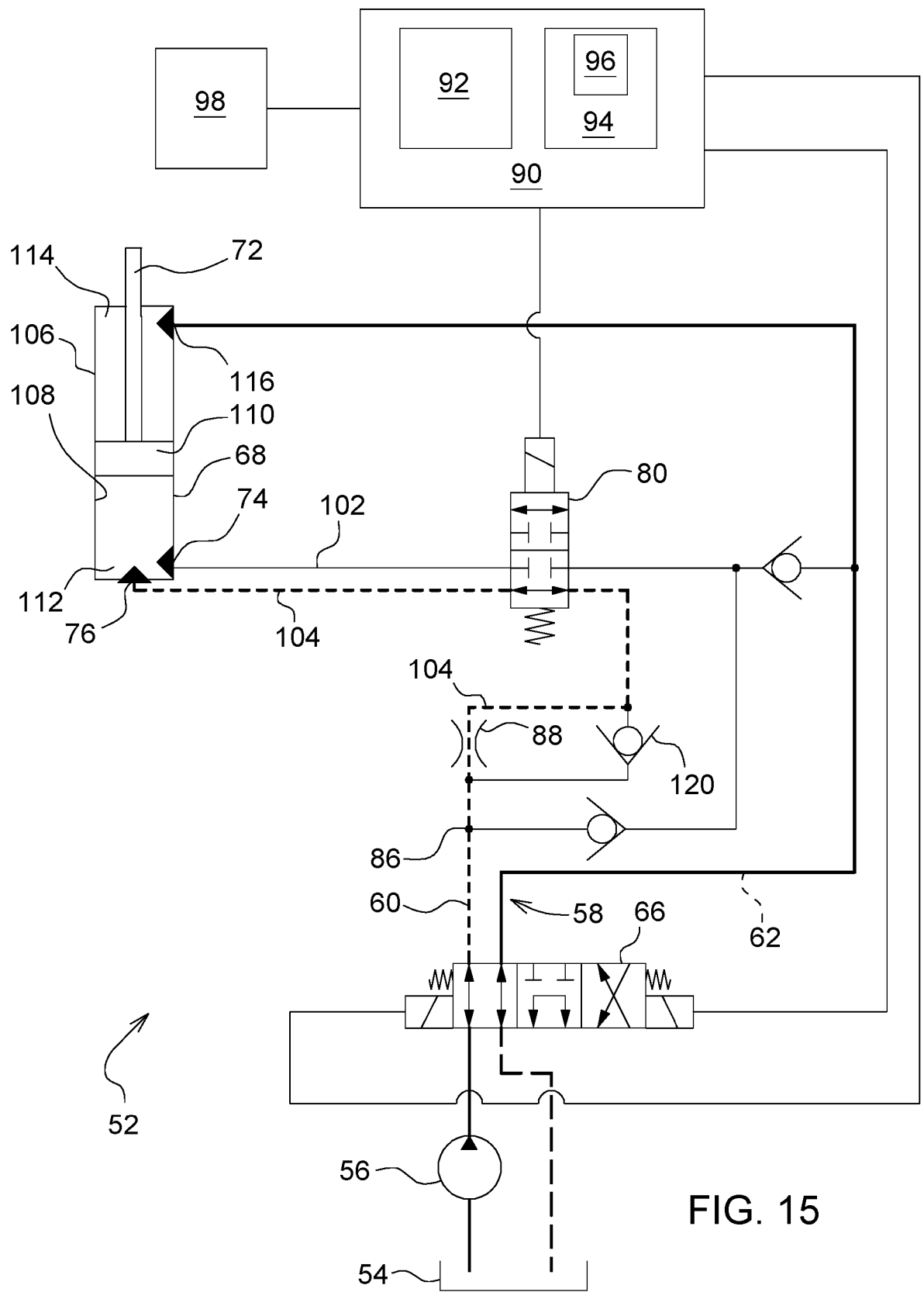
FIG. 15 is a schematic view of the third alternative embodiment of the hydraulic system of FIG. 13, shown in a third configuration.

A third alternative embodiment of the hydraulic system is generally shown in FIGS. 13-15. The reference numerals used to identify the features of the hydraulic system shown in FIGS. 2-6 are used to identify the same features of the hydraulic system shown in FIGS. 13-15. Referring to FIGS. 13-15, the hydraulic system is shown in three different configurations. FIG. 13 shows the hydraulic system configured to raise the rear gate at the first speed. FIG. 14 shows the hydraulic system configured to lower the rear gate at the first speed. FIG. 15 shows the hydraulic system configured to lower the rear gate at the second speed.

Referring to FIG. 13, the flow direction control valve 66 is shown controlled into the first position of the flow direction control valve 66, and the flow rate control valve 80 is shown controlled into the second position of the flow rate control valve 80. The flow rate control valve 80 includes a two position four port valve. In the first position of the flow rate control valve 80, fluid communication through the first branch line 102 is allowed and fluid communication through the second branch line 104 is blocked. In the second position of the flow rate control valve 80, fluid communication through the first branch line 102 is blocked and fluid communication through the second branch lie 104 is allowed. In this configuration, pressurized fluid from the pump 56 is directed through the first circuit portion 60 of the fluid circuit 58 to the second branch line 104, through the flow rate control valve 80, and to the second fluid port 76. Fluid from the third fluid port 116 of the hydraulic gate cylinder 68 is directed through the second circuit portion 62 of the fluid circuit 58 back to the tank 54. The flow rate control valve 80 is positioned in its second position, such that the fluid moving through the first branch line 102 is blocked by the flow rate control valve 80. As such, no fluid flows through the first fluid port 74. In this direction, fluid is free to flow through the check valve 120 at the first fluid flow rate. It should be appreciated that little or minimal fluid may leak through the flow restriction 88. In this configuration, the rear gate 32 is moved toward the open position at the first speed.

Referring to FIG. 14, the flow direction control valve 66 is shown controlled into the second position of the flow direction control valve 66, and the flow rate control valve 80 is shown controlled into the first position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the first fluid port 74 of the hydraulic gate cylinder 68 and through the first branch line 102 back to the tank 54. Fluid flow through the second branch line 104 and the second fluid port 76 is blocked. The flow rate control valve 80 is positioned in its first position, such that the fluid moving through the first branch line 102 moves directly through the flow rate control valve 80 at the first fluid flow rate. In this configuration, the rear gate 32 is moved toward the closed position at the first speed.

Referring to FIG. 15, the flow direction control valve 66 is shown controlled into the second position of the flow direction control valve 66, and the flow rate control valve 80 is shown controlled into the second position of the flow rate control valve 80. In this configuration, pressurized fluid from the pump 56 is directed through the second circuit portion 62 of the fluid circuit 58 to the third fluid port 116 of the hydraulic gate cylinder 68. Fluid from the first fluid volume 112 of the hydraulic gate cylinder 68 is directed through the second fluid port 76, the second branch line 104, and the flow rate control valve 80 to the first circuit portion 60 of the fluid circuit 58 and back to the tank 54. The flow rate control valve 80 is positioned in its second position, such that the fluid flow through the first branch line 102 and the first fluid port 74 is blocked by the flow rate control valve 80. As such, fluid is directed through the second branch line 104 and the flow restriction 88 included therein at the second fluid flow rate. In this configuration, the rear gate 32 is moved toward the closed position at the second speed.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for operating a rear gate of a baler implement, the hydraulic system comprising:
   a tank operable to store a supply of a fluid;
   a pump disposed in fluid communication with the tank and operable to circulate the fluid through a fluid circuit;
   a hydraulic cylinder having a housing defining an interior and a piston moveably disposed within the interior of the housing, the housing and the piston cooperating to define a first fluid volume on a first side of the piston and a second fluid volume on an opposing second side of the piston, wherein the housing includes a first fluid port and a second fluid port each in fluid communication with the first fluid volume of the hydraulic cylinder;
   a first control valve moveable between a first position for directing fluid to or from the first fluid port, and a second position for directing fluid to or from the second fluid port;
   wherein the first control valve directs fluid to or from the first fluid port at a first flow rate when disposed in the first position and directs fluid to or from the second fluid port at a second flow rate when disposed in the second position, with the second flow rate being different than the first flow rate;
   wherein the fluid circuit includes a first circuit portion in selective fluid communication with one of the pump and the tank, a first branch line connected to and in fluid communication with the first circuit portion and the first fluid port of the hydraulic cylinder, and a second branch line connected to and in fluid communication with the first circuit portion and the second fluid port of the hydraulic cylinder; and
   wherein the first control valve is a two position spool valve in which fluid communication through the first branch line is allowed at the first flow rate when the first control valve is disposed in the first position, and fluid communication through the first branch line is blocked when the first control valve is disposed in the second position.

2. The hydraulic system set forth in claim 1, wherein the first branch line includes the first control valve.

3. The hydraulic system set forth in claim 2, wherein the second branch line includes a flow restriction operable to allow fluid flow through the flow restriction at the second flow rate.

4. The hydraulic system set forth in claim 1, wherein the first control valve is normally biased into the first position.

5. The hydraulic system set forth in claim 1, wherein the second flow rate is less than the first flow rate.

6. The hydraulic system set forth in claim 1, wherein the housing includes a third fluid port in fluid communication with the second fluid volume of the hydraulic cylinder.

7. The hydraulic system set forth in claim 6, wherein the fluid circuit includes a second circuit portion in fluid communication with the third fluid port and in selective fluid communication with one of the pump and the tank.

8. The hydraulic system set forth in claim 7, further comprising a second control valve moveable between a first position connecting the pump and the first circuit portion of the fluid circuit in fluid communication and connecting the tank and the second circuit portion of the fluid circuit in fluid communication, and a second position connecting the first circuit portion of the fluid circuit and the tank in fluid communication and connecting the second circuit portion of the fluid circuit and the pump in fluid communication.

9. The hydraulic system set forth in claim 8, wherein the second control valve includes a third position directly connecting the pump and the tank in fluid communication, and wherein the third position of the second control valve blocks fluid communication to both the first circuit portion and the second circuit portion of the fluid circuit from both the pump and the tank.

10. The hydraulic system set forth in claim 8, further comprising a controller, wherein the controller is disposed in communication with and operable to control movement of the first control valve between the first position of the first control valve and the second position of the first control valve, and wherein the controller is disposed in communication with and operable to control movement of the second control valve between at least the first position of the second control valve and the second position of the second control valve.

11. The hydraulic system set forth in claim 1, wherein fluid communication through the second branch line is blocked when the first control valve is disposed in the first position, and fluid communication through the second branch line is allowed when the first control valve is disposed in the second position.

12. The hydraulic system set forth in claim 1, further comprising a port control valve in fluid communication with the second branch line, wherein the port control valve is controllable between a first position allowing fluid flow through the second branch line, and a second position blocking fluid flow through the second branch line.

13. A baler implement comprising:
   a body forming a baling chamber;
   a rear gate rotatably attached to the body and rotatable about a gate axis between a closed position, an open position, and at least one intermediate position disposed between the closed position and the open position;
   a tank operable to store a supply of a fluid;
   a pump disposed in fluid communication with the tank and operable to circulate the fluid through a fluid circuit;
   a hydraulic cylinder interconnecting the body and the rear gate and operable for raising and lowering the rear gate relative to the body, the hydraulic cylinder having a housing defining an interior and a piston moveably disposed within the interior of the housing, the housing and the piston cooperating to define a first fluid volume on a first side of the piston and a second fluid volume on an opposing second side of the piston, wherein the housing includes a first fluid port and a second fluid port each in fluid communication with the first fluid volume of the hydraulic cylinder;

a flow rate control valve moveable between a first position for directing fluid to and from the first fluid port at a first flow rate to move the rear gate at a first speed, and a second position for directing fluid to and from the second fluid port at a second flow rate that is different than the first flow rate, to move the rear gate at a second speed that is different than the first speed;

wherein the fluid circuit includes a first circuit portion in selective fluid communication with one of the pump and the tank, a first branch line connected to and in fluid communication with the first circuit portion and the first fluid port of the hydraulic cylinder, and a second branch line connected to and in fluid communication with the first circuit portion and the second fluid port of the hydraulic cylinder; and wherein the flow rate control valve is a two position spool valve normally biased into the first position in which fluid communication through the first branch line is allowed at the first flow rate when the flow rate control valve is disposed in the first position, and fluid communication through the first branch line is blocked when the flow rate control valve is disposed in the second position; and wherein fluid communication through the second branch line is blocked when the flow rate control valve is disposed in the first position, and fluid communication through the second branch line is allowed when the flow rate control valve is disposed in the second position.

14. The baler implement set forth in claim 13, wherein the second branch line includes a flow restriction operable to allow fluid flow through the flow restriction at the second flow rate.

15. The baler implement set forth in claim 13, wherein the housing includes a third fluid port in fluid communication with the second fluid volume of the hydraulic cylinder, and wherein the fluid circuit includes a second circuit portion in fluid communication with the third fluid port and in selective fluid communication with one of the pump and the tank.

16. The baler implement set forth in claim 15, further comprising a flow direction control valve moveable between a first position connecting the pump and the first circuit portion of the fluid circuit in fluid communication and connecting the tank and the second circuit portion of the fluid circuit in fluid communication, and a second position connecting the first circuit portion of the fluid circuit and the tank in fluid communication and connecting the second circuit portion of the fluid circuit and the pump in fluid communication.

17. The baler implement set forth in claim 16, further comprising a controller, wherein the controller is disposed in communication with and operable to control movement of the flow rate control valve between the first position of the flow rate control valve and the second position of the flow rate control valve, and wherein the controller is disposed in communication with and operable to control movement of the flow direction control valve between at least the first position of the flow direction control valve and the second position of the flow direction control valve.

* * * * *